Sept. 19, 1961     D. MOHLER ET AL     3,001,108

ELECTROLYTIC CAPACITOR AND ELECTROLYTE THEREFOR

Filed Dec. 19, 1958

Inventors,
Donald Mohler,
Norman W. Cronquist,
by Gilbert P. Tarleton
Their Attorney.

ELECTROLYTIC CAPACITOR AND ELECTROLYTE THEREFOR

Donald Mohler, Saratoga Springs, and Norman W. Cronquist, Glens Falls, N.Y., assignors to General Electric Company, a corporation of New York
Filed Dec. 19, 1958, Ser. No. 781,704
8 Claims. (Cl. 317—230)

The present invention relates to electrolytic capacitors, and more particularly to an improved fill electrolyte therefor.

A large variety of electrolyte compositions have been used heretofore for electrolytic capacitors, but in general the known compositions have been found satisfactory only for relatively limited temperature ranges. This is especially true of the water-glycol type electrolytes which have been widely used in preference to inorganic electrolytes such as strong mineral acids since the latter tend to be destructive of capacitor parts with which they come in contact. Temperatures in the vicinity of 100° C. have heretofore been considered a practical upper limit for electrolyte systems of water-organic type. In recent years, however, the development of electrical equipment designed for use in increasingly higher ambient temperatures has placed considerable emphasis on the need for electrical components such as capacitors which are capable of reliable operation even under elevated temperature and high voltage conditions.

It is an object of the present invention to provide a capacitor having a high degree of stability and improved life characteristics when operated at high voltages and over a wide range of temperature, and in particular is capable of operation up to 150° C. and above.

It is another object of the invention to provide a nonaqueous fill electrolyte which confers the above improved characteristics on electrolytic capacitors.

In accordance with the present invention, the above objects, and others which will become apparent hereinafter, are achieved in an electrolytic capacitor which comprises a plurality of electrodes at least one of which is composed of a film-forming metal, and an electrolyte comprising diethyl cyanamide and an ionogen, such as potassium thiocyanate, dissolved therein.

Figure 1:
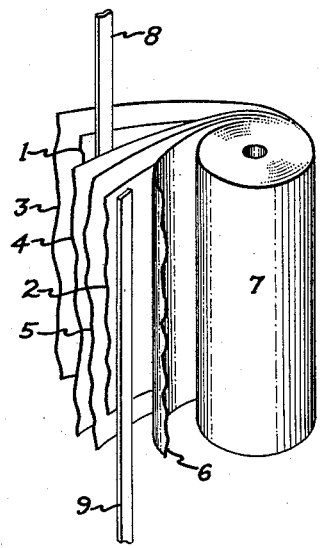
Figure 2:
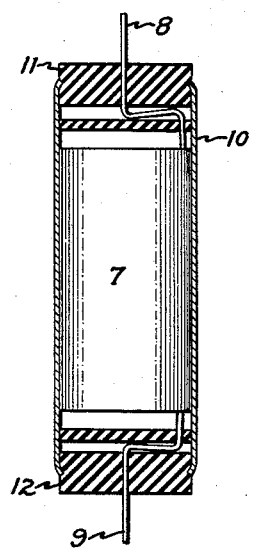

The invention will be better understood from the following description taken in conjunction with the accompanying drawing, in which:

FIG. 1 shows an electrolytic capacitor roll of a type to which the present invention is applicable; and FIG. 2 shows a capacitor assembly with the roll body of FIG. 1 enclosed in a casing.

Referring now to the drawing, there is shown in FIG. 1 a partially unrolled capacitor roll body having electrode foils 1 and 2, at least one of which is made of tantalum or other suitable film-forming metal and being advantageously, although not necessarily, etched and having a dielectric oxide film formed thereon in accordance with known practice. Spacer strips 3, 4, 5 and 6 composed of porous dielectric material such as cellulose paper of a high degree of porosity are arranged separating electrode foils 1 and 2, and the electrodes and spacers are all wound into a compact roll 7 suitable for impregnation with the electrolyte of the present invention. The roll may be impregnated with the electrolyte either before or after insertion into a casing or other container, as is well known in the art. Tap straps 8 and 9 of opposite polarity are respectively fixed in contact with the electrodes 1 and 2 and serve as capacitor terminals.

FIG. 2 shows a capacitor in which the rolled capacitor body 7 is assembled in a casing 10 with terminals 8 and 9 extending respectively through plugs or closures 11 and 12 of suitable insulating material which serve to seal off the opposite ends of casing 10.

The electrolyte described herein when adjusted to suitably low resistivities would also be satisfactory for use in sintered slug type tantalum capacitors.

The electrolyte of the present invention consists principally of diethyl cyanamide and a suitable ionogen dissolved therein to provide for the necessary conductivity in the electrolyte. Generally, the ionogen will be present in extremely minute amounts, and ordinarily an amount of the ionogen is used which will not precipitate at $-55°$ C. Within such limitation, higher concentrations of ionogen may be used for low voltage applications, whereas lower concentrations of ionogen may be used for higher voltage applications. In general, the range of ionogen content will be from about .01% (or trace amounts) to about 3% by weight of the entire electrolyte composition.

A particularly preferred ionogen for the present electrolyte is potassium thiocyanate, this material being readily soluble in the diethyl cyanamide and imparting a desirable flexibility in the particular resistivity which it is desired to obtain in the electrolyte solution. Table I below shows resistivities which are obtainable with the combination of diethyl cyanamide and potasium thiocyanate, the amount of the latter being shown in percent by weight:

TABLE I

*Diethyl cyanamide plus KSCN*

| Percent KSCN | Temperature, ° C. | Resistivity, Ohm-cm. |
|---|---|---|
| .02 | 25 | 9,500 |
| .04 | 25 | 5,330 |
|  | −55 | 28,520 |
| .5 | 25 | 614 |
|  | −55 | 3,165 |
| 1.0 | 25 | 380 |
|  | −55 | 2,016 |
| 2.0 | 25 | 260 |
|  | −55 | 1,425 |
| 3 | 25 | 220 |
|  | −55 | 1,290 |

Ammonium thiocyanate is also similarly soluble in diethyl cyanamide and may be used instead of potassium thiocyanate to obtain somewhat similar resistivities as shown above. Other salts which are soluble in diethyl cyanamide may be used, such as alkaline borates, alkyl phosphates, oxalates, citrates, tartrates, succinates, nitrates, halides, dichromates, and acetates having good solubility characteristics in the diethyl cyanamide solvent of the present invention.

An electrolyte which has been found particularly satisfactory for use in the present invention has the following composition in percent by weight:

ELECTROLYTE A

| | Percent |
|---|---|
| Potassium thiocyanate | 0.02 |
| Diethyl cyanamide | 99.98 |

Life tests made on electrolytic capacitors incorporating the above composition under conditions of 150 volts D.C. and 150° C. have shown remarkably good properties in such electrolytic capacitors. The capacitor units tested comprised anodes and cathodes of .5 mil tantalum foils and two sheets of porous paper spacers of about 1.2 mil thickness between the electrode foils. In these life tests it was found that the majority of units so constructed and impregnated still operated efficiently under the above voltage and temperature conditions even after a testing period of over 2,520 hours. After this period, the average initial room temperature capacitance still retained in those units was about 85% as measured at 1,000 per second and about 95% at 120 cycles per second.

The life tests also showed that the present units have excellent insulation resistance even at 150° C. The units also showed relatively small change in power factor characteristics even after 2,000 hours of operation under the above conditions.

The present electrolyte composition incorporating diethyl cyanamide offers a number of advantages over electrolytes containing dimethyl formamide which has previously been suggested for high temperature applications. The diethyl cyanamide, for one thing, has a higher boiling point and is therefore less volatile at the higher temperature ranges. Of particular significance is the lower vapor pressure of diethyl cyanamide over the entire range of −55 to 150° C. for which the present capacitors are operable.

The physical characteristics of diethyl cyanamide represent a considerable improvement over those of dimethyl formamide as illustrated by the comparison below:

|  | Diethyl Cyanamide | Dimethyl Formamide |
| --- | --- | --- |
| Freezing Point °C | −80.5 | −61 |
| Boiling Point °C | 186 | 153 |
| Flash Point °C | 80.5 | 67 |
| Vapor Pressure, 25° C mm | 28 | 88 |

By virtue of the above-described characteristics, the present diethyl cyanamide capacitors may be operated at a higher temperature than dimethyl formamide capacitors with lower internal pressure being generated than in the case of the latter. Moreover, longer life at any temperature within the operating range will be obtained by virtue of the lower vapor pressure of diethyl cyanamide since the physical and chemical characteristics of the electrolyte are less subject to change by leakage or evaporation through the seal.

A series of comparative tests to determine respective thermal and chemical stability was made between the above two electrolytes, diethyl cyanamide and dimethyl formamide, each having dissolved in it a small amount of lithium dichloride as the ionogen. The solutions of diethyl cyanamide plus 0.5% of lithium chloride and dimethyl formamide with 0.5% of lithium chloride were each subjected to a temperature of 130° C. After 60 days the diethyl cyanamide solution showed no change in resistivity and a volume reduction of less than 10%, whereas the dimethyl formamide solution showed under the same conditions a 50% reduction in resistivity and a volume reduction of 40–50%.

The following are additional examples of electrolyte compositions which are suitable for use in accordance with the invention, it being understood that the invention is not limited to the particular ionogen materials or percentages thereof as set forth:

(1) Diethyl cyanamide plus 1% tetramethylammonium bromide
(2) Diethyl cyanamide plus 1% boric acid
(3) Diethyl cyanamide plus 1% ammonium oxalate
(4) Diethyl cyanamide plus 1% lithium chloride Organic and inorganic salts other than those mentioned above may also be used provided they are not cathodically reduced to a metallic or other interfering material at the cathode, or oxidized to an interfering compound at the anode.

The present diethyl cyanamide electrolyte is exceptionally stable and resistant under severe conditions of heat, light and chemical change, it has considerably lower freezing point and higher boiling point than conventional fill electrolytes, is not corrosive to the metals usually employed as capacitor casings, and has no solvent action on the formed oxide films of the capacitor electrodes. The diethyl cyanamide electrolyte further has very little change in viscosity with widely varying temperatures, and this characteristic provides minimum resistivity change with temperature, as well as minimum capacitance change with temperature.

Being non-aqueous, the present electrolyte has lower vapor pressure than aqueous types of electrolytes and thereby presents a lesser problem in maintaining a tight seal around the capacitor. Moreover, the electrolyte avoids the difficulties encountered in the use of known electrolytes containing mixed solvents, wherein one of the solvents more readily vaporizes and thus changes the chemical composition, viscosity, resistivity and freezing point of the electrolyte, and leads to wide changes in capacitance. With the present electrolyte, containing practically 100% diethyl cyanamide, as much as 50% of the electrolyte could be lost without appreciably changing the electrical properties or operability of the capacitor.

There is thus provided by the invention an electrolytic capacitor which enables the use of single section single-cased high voltage units having an operating temperature of 150° C. and above. The invention also makes possible a considerable simplification in the manufacture of capacitors while at the same time providing units having improved stability under higher ambient conditions than heretofore considered permissible.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrolytic capacitor comprising a plurality of electrodes at least one of which is composed of a film-forming metal, and an electrolyte consisting essentially of diethyl cyanamide and an amount of an ionogen dissolved therein which will remain in solution at about −55° C.

2. An electrolytic capacitor comprising a pair of electrodes at least one of which is composed of a film-forming metal, and an electrolyte consisting essentially of diethyl cyanamide and an ionogen comprising a thiocyanate compound in sufficient amount to provide electrical conductivity in the electrolyte.

3. An electrolytic capacitor comprising a pair of electrodes at least one of which is composed of a film-forming metal, and an electrolyte consisting essentially of diethyl cyanamide and an ionogen comprising potassium thiocyanate in sufficient amount to provide electrical conductivity in the electrolyte.

4. An electrolytic capacitor comprising a pair of electrodes at least one of which is composed of a film-forming metal, and an electrolyte consisting essentially in percent by weight of about 99.99%–97% of diethyl cyanamide and .01–3% of potassium thiocyanate.

5. An electrolytic capacitor comprising a plurality of electrodes at least one of which is composed of a film-forming metal, dielectric spacer means between said electrodes, and an electrolyte impregnating said dielectric spacer means, said electrolyte being composed of a solution of .01–3% by weight of potassium thiocyanate in a solvent composed of diethyl cyanamide.

6. A liquid electrolyte for electrolytic capacitors consisting essentially of an ionogen in a solvent comprising diethyl cyanamide, the ionogen being present in sufficient amount to provide electrical conductivity in the electrolyte.

7. A liquid electrolyte for electrolytic capacitors consisting essentially of a solution of potassium thiocyanate in a solvent consisting of diethyl cyanamide, the potassium thiocyanate being present in sufficient amount to provide electrical conductivity in the electrolyte.

8. A liquid electrolyte for electrolytic capacitors consisting of a solution of .01–3% by weight of potassium thiocyanate in a solvent composed of diethyl cyanamide.

References Cited in the file of this patent

UNITED STATES PATENTS

| | | |
|---|---|---|
| 2,165,090 | Clark | July 4, 1939 |
| 2,786,165 | Ross | Mar. 19, 1957 |
| 2,851,642 | Schaeren | Sept. 9, 1958 |
| 2,866,139 | Ross | Dec. 23, 1958 |

UNITED STATES PATENT OFFICE
CERTIFICATE OF CORRECTION

Patent No. 3,001,108            September 19, 1961

Donald Mohler et al.

It is hereby certified that error appears in the above numbered patent requiring correction and that the said Letters Patent should read as corrected below.

Column 2, line 67, for "lift" read -- life --; column 3, line 1, for "1,000 per" read -- 1,000 cycles per --; same column 3, line 46, for "dichloride" read -- chloride --.

Signed and sealed this 3rd day of April 1962.

(SEAL)
Attest:

ERNEST W. SWIDER
Attesting Officer

DAVID L. LADD
Commissioner of Patents